(12) United States Patent
Kedem

(10) Patent No.: US 7,287,238 B2
(45) Date of Patent: Oct. 23, 2007

(54) METHOD AND APPARATUS FOR EXPOSING PRE-DIFFUSED IP BLOCKS IN A SEMICONDUCTOR DEVICE FOR PROTOTYPING BASED ON HARDWARE EMULATION

(75) Inventor: Rafael Kedem, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 937 days.

(21) Appl. No.: 10/603,905

(22) Filed: Jun. 25, 2003

(65) Prior Publication Data

US 2004/0267517 A1 Dec. 30, 2004

(51) Int. Cl.
*G06F 17/50* (2006.01)
*H03K 17/693* (2006.01)

(52) U.S. Cl. .............. 716/16; 716/4; 716/5; 716/18; 703/23; 703/25

(58) Field of Classification Search ............. 716/1, 716/4, 5, 16–18; 703/13, 14, 23–28; 714/718, 714/741–743
See application file for complete search history.

(56) References Cited

U.S. PATENT DOCUMENTS 5,329,470 A * 7/1994 Sample et al. ............ 703/28
5,477,475 A * 12/1995 Sample et al. ............ 716/16
5,581,742 A * 12/1996 Lin et al. ................. 716/4
5,737,578 A * 4/1998 Hennenhoefer et al. ... 711/168
6,263,484 B1 * 7/2001 Yang ....................... 716/18
6,347,395 B1 * 2/2002 Payne et al. .............. 716/18
6,539,535 B2 * 3/2003 Butts et al. ............... 716/17
7,055,113 B2 * 5/2006 Broberg et al. ............ 716/1

* cited by examiner

*Primary Examiner*—Paul Dinh
*Assistant Examiner*—Nghia M. Doan
(74) *Attorney, Agent, or Firm*—Suiter Swantz PC LLO

(57) ABSTRACT

The present invention is directed to a method and apparatus for exposing pre-diffused IP blocks in a semiconductor device for prototyping based on hardware emulation. Addresses may be provided to multiplexers through configuration pins. The input ports of the multiplexers may be connected to interface pins of the pre-diffused IP blocks, and the output ports of the multiplexers may be connected to I/O pins which provide input and output to the semiconductor device. Through controlling the signals on the configuration pins and thus the outputs of multiplexers, any single pre-diffused IP blocks or any combination of the pre-diffused IP blocks in the semiconductor device may be exposed through corresponding I/O pins for prototyping.

16 Claims, 2 Drawing Sheets

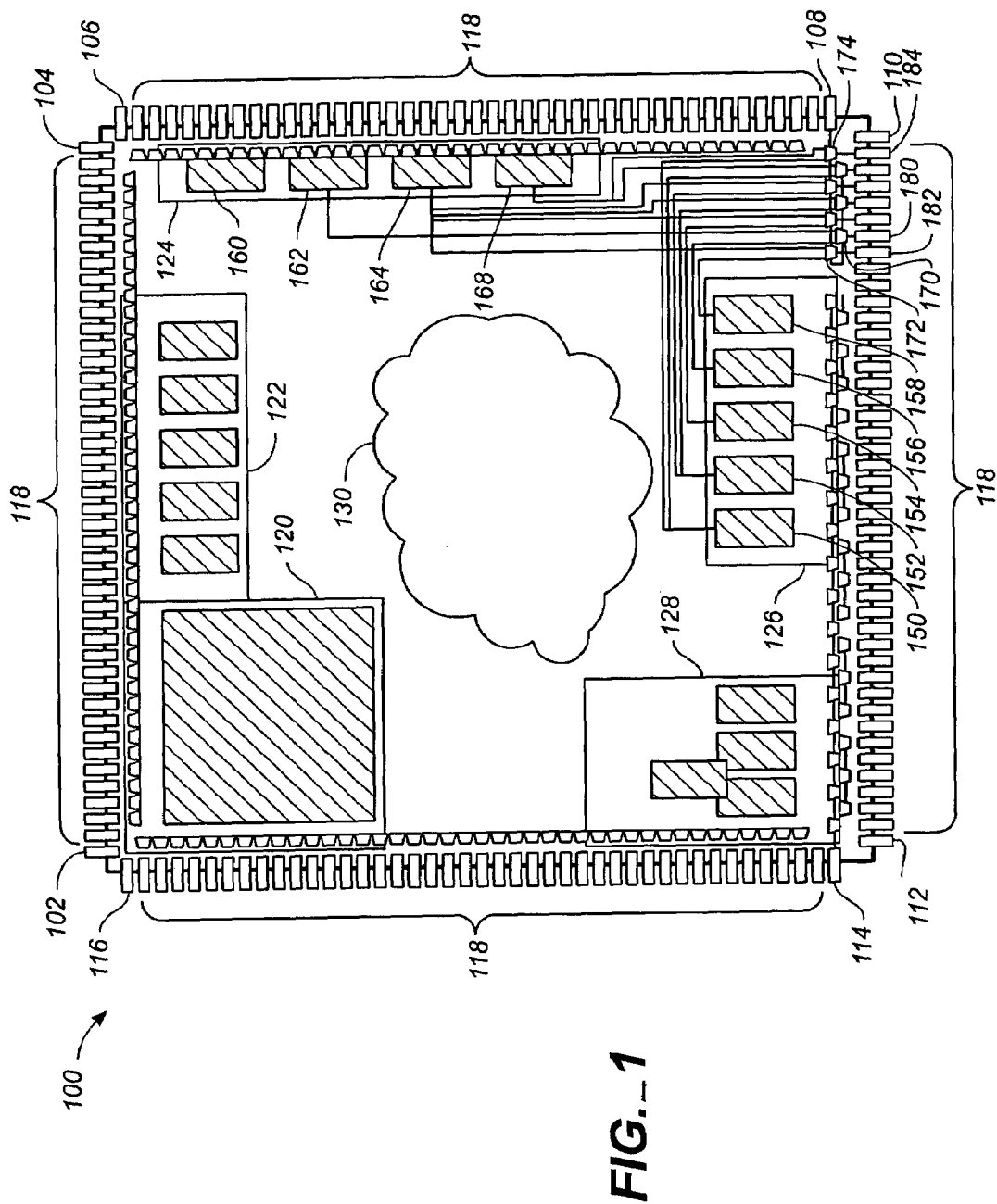
FIG._1

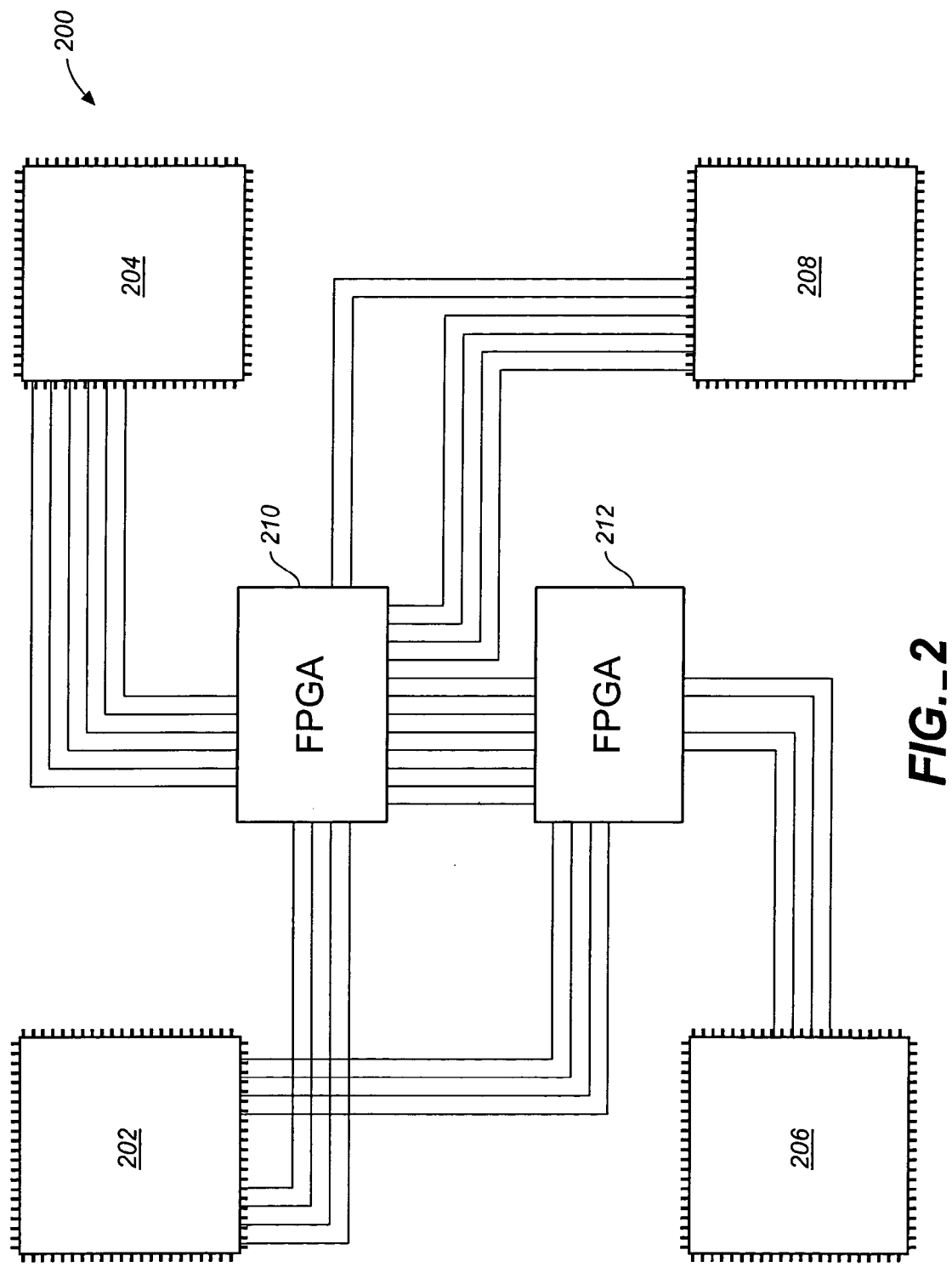
FIG._2

METHOD AND APPARATUS FOR EXPOSING PRE-DIFFUSED IP BLOCKS IN A SEMICONDUCTOR DEVICE FOR PROTOTYPING BASED ON HARDWARE EMULATION

FIELD OF THE INVENTION

This invention relates generally to the field of integrated circuit design, and particularly to a method and apparatus for exposing pre-diffused IP blocks in a semiconductor device for prototyping based on hardware emulation.

BACKGROUND OF THE INVENTION

Representing the internal SOC (system-on-chip) interface for the purpose of emulation is generally done by exposing one or more of the internal SOC buses, allowing system engineers to extend the emulation part utilizing external FPGA (field programmable gate array). While this approach is useful for most of the cases, it does not allow exposure of all the required interfaces for a complete and accurate emulation. Due to a limited pin count, a majority of the IC designs allow only some of the interfaces to be exposed (or some of the interfaces may be multiplexed into a unified exposed interface).

To overcome the shortcomings of limited interface exposure via the emulation device I/O, and to verify a designed circuit more accurately, prototyping technologies based on hardware emulation for verifying a designed circuit are highly pursued because hardware emulation is closer to the actual digital circuit. In a general prototyping system based on hardware emulation, the digital circuit for verification may be implemented in the prototyping engine which is composed by interconnecting reusable field programmable devices (RFPDs) and other discrete devices such as microprocessors, digital signal processors, application specific non-memory devices or memories. A RFPD includes FPGA, programmable logic device (PLD), and the like. RFPDs have been frequently used in prototyping since a digital circuit may be implemented in the RFPDs by being simply programmed onto the RFPDs, and further, the RFPDs may be reused.

Recently a semiconductor device called "slice" (e.g., RapidSlice™ developed by LSI Logic Corporation, and the like) has been developed. A slice is a pre-manufactured chip in which all silicon layers have been built, leaving the metal layers to be completed with the customer's unique IP (intellectual property). The slice may include pre-diffused IP blocks such as memory, microprocessors, PCI-X controllers, and the like that suit the slice to a given target market, and an area of customizable logic where the customer logic may be implemented using the metal layers. A shell, i.e., some logic infrastructure, may personalize one or more pre-diffused IP blocks as an IP Subsystem. Such an IP subsystem may represent an integrated design, which includes one or more pre-diffused IP blocks and the associated shell. Each subsystem of the slice may have a SOC interface that permits the designer to interface and utilize the subsystem as part of the area of customizable logic.

A slice may enhance the efficiency of IC design since the slice may provide a designer with ready-made pre-diffused IP blocks in the slice. For example, when an IC designer needs to include an ARM microprocessor in a product, the designer may prefer to utilize a ready-made pre-diffused ARM microprocessor in a slice for prototyping rather than incorporating such an ARM microprocessor within the customized logic. However, there is a practical difficulty in this approach because the pre-diffused IP blocks (e.g., the ARM microprocessor) in the slice are typically not exposed for prototyping—the interface pins of the pre-diffused IP blocks are not normally accessible form outside the slice.

Therefore, it would be desirable to provide a method and apparatus for exposing all required pre-diffused IP blocks or IP subsystems, in a semiconductor device for the purpose of accurate prototyping based on hardware emulation.

SUMMARY OF THE INVENTION

Accordingly, the present invention is directed to a method and apparatus for exposing pre-diffused IP blocks in a semiconductor device for prototyping based on hardware emulation. According to an exemplary aspect of the present invention, multiple interfaces may be provided through shared I/O pins by selecting specific multiplexer configurations through configuration pins. A pre-diffused IP with internal SOC interfaces may be exposed by routing it to a shared pin multiplexer and may be selected for exposure by selecting a specific multiplexer configuration pins. In the event that such pre-diffused IP interfaces outside of the chip through a dedicated I/O pins, such pins may still be shared with other interfaces that require exposure. Through controlling the signals on the configuration pins and thus controlling the multiplexers currently usable I/O, any single pre-diffused IP blocks or any combination of the pre-diffused IP blocks in the semiconductor device may be exposed through corresponding I/O pins for prototyping.

In order to overcome the limited number of I/Os of such emulation device, different multiplexer configurations may expose part of the pre-diffused IP, but by utilizing all possible multiplexer configurations, all the pre-diffused IP and/or available IP subsystems may be exposed to allow full utilization of all the available IP on the slice for the purpose of prototyping. As such, one instance or multiple instances of the same emulations device, each instance being configured differently through the multiplexer configurations pins, may allow such accurate emulation.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a schematic diagram of an exemplary semiconductor device in which the present invention may be implemented; and FIG. 2 is a schematic diagram illustrating an exemplary embodiment of the present invention, wherein four semiconductor devices are connected to two FPGAs for prototyping.

DETAILED DESCRIPTION OF THE INVENTION

Reference will now be made in detail to the presently preferred embodiments of the invention, examples of which are illustrated in the accompanying drawings.

Referring first to FIG. 1, a schematic diagram of an exemplary semiconductor device 100 in which the present invention may be implemented is shown. The semiconductor device 100 may be a test chip or emulation part made based on an available slice. A slice is a pre-manufactured chip in which all silicon layers have been built, leaving the metal layers to be completed with the customer's unique IP. The semiconductor device 100 may include pre-diffused IP blocks such as a microprocessor, a ROM, a PCI-X controller, and the like. A shell, i.e., some logic infrastructure, may personalize one or more pre-diffused IP blocks as an IP subsystem. An IP subsystem may represent an integrated design, which includes one or more pre-diffused IP blocks and the associated shell. As shown in FIG. 1, the semiconductor device 100 may include IP subsystems 120, 122, 124, 126, and 128. Each IP subsystem may include one or more pre-diffused IP blocks on the slice. For example, the IP subsystem 124 may include pre-diffused IP blocks 160, 162, 164, and 168, and the IP subsystem 126 may include pre-diffused IP blocks 150, 152, 154, 156, and 158. The semiconductor device 100 may include an area of customizable logic 130. The area of customizable logic 130 may be a sea-of-gates structure whose function may be defined by the customer. Each IP subsystem 120, 122, 124, 126, or 128 may have a system-on-chip (SOC) interface that permits the IP subsystem to interface with the area of customizable logic 130.

The semiconductor device 100 may further include configuration pins 102, 104, 106, 108, 110, 112, 114, and 116 around its four corners, and input/out (I/O) pins 118 on its four sides. The I/O pins 118 may provide input and output for the semiconductor device 100.

The present invention is directed to a method and apparatus for exposing pre-diffused IP blocks in a semiconductor device for prototyping based on hardware emulation. As shown in FIG. 1, the semiconductor device 100 may include multiple 2-input multiplexers on its four sides. A 2-input mutiplexer may have its input ports connected to interface pins of two different pre-diffused IP blocks, or IP subsystems, and its output port connected to an I/O pin. Configurations pins, one or more, may be used to select which of the input signals appears at the I/O pin. Thus, through controlling the signals ("0" or "1") on the configuration pins, which interface pin of the two IP blocks is actually connected to the I/O pin may be controlled, that is, which of the two IP blocks may be exposed to prototyping through the I/O pin may be controlled.

As shown in FIG. 1, for example, a configuration pin 108 may be provided to multiplexers 170, 172, and 174. The multiplexer 170 may be connected to an interface pin of the IP block 156 and an interface pin of the IP block 162 and output at an I/O pin 180. The multiplexer 172 may be connected to an interface pin of the IP block 158 and an interface pin of the IP block 164 and may output at an I/O pin 182. The multiplexer 174 may be connected to an interface pin of the IP block 150 and an interface pin of the IP block 168 and may output at an I/O pin 184. When the signal on the configuration pin 108 is "1" ("high"), the multiplexer 170 may output the signals on the interface pin of the IP block 156 at the I/O pin 180, the multiplexer 172 may output the signals on the interface pin of the IP block 158 at the I/O pin 182, and the multiplexer 174 may output the signals on the interface pin of the IP block 150 at the I/O pin 184. Thus, when the signal on the configuration pin 108 is "1" ("high"), the IP blocks 156, 158, and 150 may be exposed for prototyping, that is, the IP blocks 156, 158, and 150 may interface directly with RFPDs (not shown in FIG. 1, but see FIG. 2) through the I/O pins 180, 182, 184, respectively. Alternately, when the signal on the configuration pin 108 is "0" ("low"), the multiplexer 170 may output the signals on the interface pin of the IP block 162 at the I/O pin 180, the multiplexer 172 may output the signals on the interface pin of the IP block 164 at the I/O pin 182, and the multiplexer 174 may output the signals on the interface pin of the IP block 168 at the I/O pin 184. Thus, when the signal on the configuration pin 108 is "0" ("low"), the IP blocks 162, 164, and 168 may be exposed for prototyping, that is, the IP blocks 162, 164, and 168 may interface directly with RFPDs (not shown in FIG. 1, but see FIG. 2) through the I/O pins 180, 182, 184, respectively.

Those of ordinary skill in the art will understand that using configuration pins to provide addresses to multiplexers and thus to control the output/input of multiplexers, any single pre-diffused IP blocks or any combination of the pre-diffused IP blocks and/or IP subsystems in the semiconductor device 100 may be exposed through corresponding I/O pins for prototyping.

It is understood that FIG. 1 is intended as an example of a semiconductor device in which the present invention may be implemented and not as an architectural limitation to the present invention. Those of ordinary skill in the art will appreciate that various combinations and arrangements may be employed without departing from the scope and spirit of the present invention. For example, although multiplexers shown in FIG. 1 have two inputs, multiplexers with three or more inputs may also be used without departing from the scope and spirit of the present invention. Additionally, the positions of configurations pins may not necessarily be around the corners of the semiconductor device.

FIG. 2 is a schematic diagram illustrating an exemplary embodiment of the present invention, wherein four semiconductor devices 202, 204, 206, and 208 are connected to two FPGAs 210 and 212 for prototyping. The semiconductor devices 202, 204, 206, and 208 may be slices and may have same or similar internal structure (not shown in FIG. 2) as the semiconductor device 100. Specifically, each of the semiconductor devices 202, 204, 206, and 208 may have pre-diffused IP blocks and an area of customizable logic. Each of the semiconductor devices 202, 204, 206, and 208 may have configuration pins around its four corners, and input/out (I/O) pins on its four sides for providing input and output for the semiconductor device, and multiplexers on its four sides. A mutiplexer may have its input ports connected to interface pins of different pre-diffused IP blocks and its output port connected to an I/O pin. A binary address may be used to select which of the input signals appears at the I/O pin. The binary address may be provided through a configuration pin, which is communicatively coupled to the mutiplexer. Thus, through controlling the signal on the configuration pin which provides an address to the mutiplexer, the interface pin of the IP blocks that is actually connected to the I/O pin may be chosen, that is, the IP block that is exposed to prototyping through the I/O pin may be controlled.

Using configuration pins to provide addresses to multiplexers and thus to control the output of multiplexers, any single pre-diffused IP blocks or any combination of the pre-diffused IP blocks in the semiconductor devices 202, 204, 206, and 208 may be exposed through corresponding I/O pins for prototyping. For example, two separate pre-diffused IP blocks in the semiconductor device 202 may be simultaneously exposed for prototyping: one for the FPGA 210, and the other for FPGA 212.

It is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for exposing pre-diffused IP blocks in a semiconductor device for prototyping based on hardware emulation, comprising:

connecting interface pins of at least two pre-diffused IP blocks in a semiconductor device to input ports of a multiplexer, wherein pre-diffused IP blocks are IP blocks in said semiconductor device whereon dopant has been deposited prior to diffusion;

connecting an output port of said multiplexer to an I/O pin of said semiconductor device;

providing an address to said multiplexer through a configuration pin of said semiconductor device to select which of said interface pins is actually connected to said I/O pin; and connecting said I/O pin to a reusable field programmable device so that a pre-diffused IP block having said selected interface pin is selected for prototyping.

2. The method of claim 1, wherein said multiplexer has two input ports.

3. The method of claim 1, wherein said multiplexer has at least three input ports.

4. The method of claim 1, wherein said reusable field programmable device is a field programmable gate array.

5. The method of claim 1, wherein said reusable field programmable device is a programmable Logic device.

6. An apparatus for exposing pre-diffused IP blocks in a semiconductor device for prototyping based on hardware emulation, comprising:

a multiplexer;

means for connecting interface pins of at least two pre-diffused IP blocks in a semiconductor device to input ports of a multiplexer, wherein pre-diffused IP blocks are IP blocks in said semiconductor device whereon dopant has been deposited prior to diffusion;

means for connecting an output port of said multiplexer to an I/O pin of said semiconductor device;

means for providing an address to said multiplexer through a configuration pin of said semiconductor device to select which of said interface pins is actually connected to said I/O pin; and means for connecting said I/O pin to a reusable field programmable device so that a pre-diffused IP block having said selected interface pin is selected for prototyping.

7. The apparatus of claim 6, wherein said multiplexer has two input ports.

8. The apparatus of claim 6, wherein said multiplexer has at least three input ports.

9. The apparatus of claim 6, wherein said reusable field programmable device is a field programmable gate array.

10. The apparatus of claim 6, wherein said reusable field programmable device is a programmable logic device.

11. An apparatus for exposing pre-diffused IP blocks in a semiconductor device for prototyping based on hardware emulation, comprising:

pre-diffused IP blocks in a semiconductor device, wherein pre-diffused IP blocks are IP blocks in said semiconductor device whereon dopant has been deposited prior to diffusion, I/O pins of said semiconductor device for providing input and output to said semiconductor device;

a multiplexer communicatively coupled to interface pins of said pre-diffused IP blocks and one of said I/O pins;

a configuration pin of said semiconductor device for providing an address to said multiplexer to select which of said interface pins is connected to said I/O pin; and a reusable field programmable device connected to said I/O pin for prototyping.

12. The apparatus of claim 11, wherein said semiconductor device is based on a slice.

13. The apparatus of claim 11, wherein said multiplexer has two input ports.

14. The apparatus of claim 11, wherein said multiplexer has at least three input ports.

15. The apparatus of claim 11, wherein said reusable field programmable device is a field programmable gate array.

16. The apparatus of claim 11, wherein said reusable field programmable device is a programmable logic device.

* * * * *